Oct. 15, 1963  J. SOLANICH RIERA  3,106,762
ELECTRONIC APPARATUS FOR DETECTING AND ELIMINATING
IRREGULARITIES IN THREADS
Filed Aug. 9, 1960  2 Sheets-Sheet 1
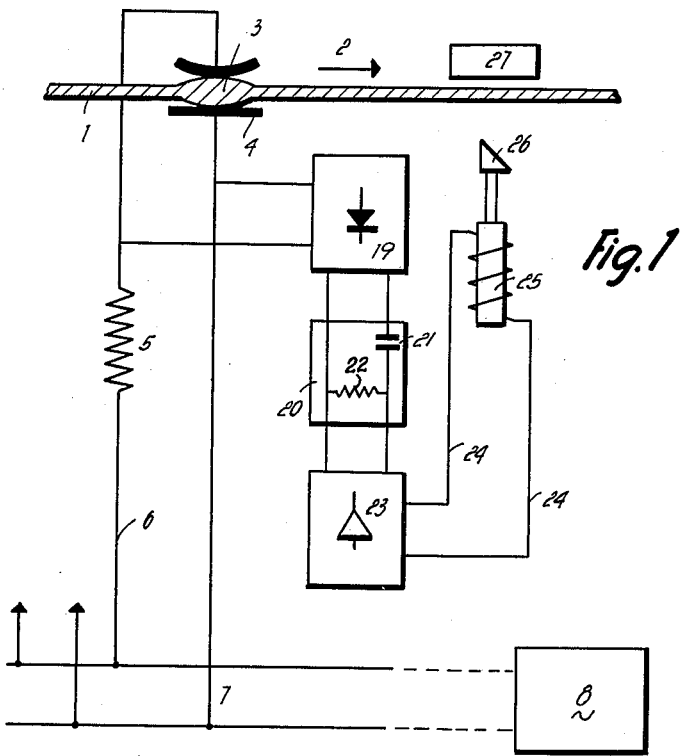
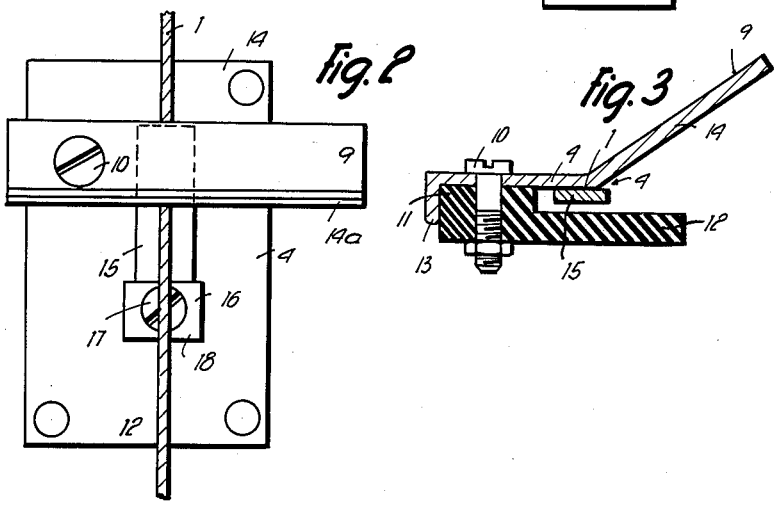
INVENTOR.
Juan Solanich Riera
BY
Michael S. Striker
Attorney Oct. 15, 1963  J. SOLANICH RIERA  3,106,762
ELECTRONIC APPARATUS FOR DETECTING AND ELIMINATING
IRREGULARITIES IN THREADS
Filed Aug. 9, 1960  2 Sheets-Sheet 2

INVENTOR.
Juan Solanich Riera
BY
Michael S. Striker
Attorney

United States Patent Office 3,106,762
Patented Oct. 15, 1963

3,106,762
ELECTRONIC APPARATUS FOR DETECTING AND
ELIMINATING IRREGULARITIES IN THREADS
Juan Solanich Riera, Pasaje Maluquer 1,
Barcelona, Spain
Filed Aug. 9, 1960, Ser. No. 48,428
Claims priority, application Spain Aug. 14, 1959
5 Claims. (Cl. 28—64)

The present invention relates to an electronic apparatus which enables the passage of irregularities in threads moving at a high speed to be detected and which produces a signal which can be used either for shutting off the machines or devices through which the thread in question is passing, for indicating the passage of the uneven portion past the point in question, or for cutting the thread and perhaps shutting off the machine at the same time in order to enable the unevenness detected to be remedied by hand.

An apparatus of this type is particularly suitable for the operations customarily performed, for remedying faults in textile thread, between two successive manipulations involved in the textile industry, for example in the transfer of the threads from the original reels to the further reels required on the machines used subsequently.

For this purpose, the apparatus to which the invention relates is characterised in that it consists of a voltage-divider to the terminals of which an alternating voltage is supplied and which consists of two impedances in series, one of which is fixed or may at most be adjustable for the purpose of preparing the machine for operation, while the other is connected with the thread to be monitored in such a way that its impedance varies as an irregularity in the thread in question passes it, the terminals of the impedance being connected to the input of a rectifier which feeds a differentiator circuit, which latter is in turn connected to an amplifier by which the signal received is converted into a current which can be utilised, via a suitable electro-mechanical converter system, to operate a knife which cuts the thread or a device which indicates the passage of the irregularity and which may be connected with means for shutting off the machine or a part thereof.

Needless to say, various types of impedances may be used in the two elements of the voltage-divider, such as a fixed or variable resistance in series with a condenser of which the capacity varies in accordance with the thickness-variations occurring in the thread being monitored; this condenser may consist of two plates, one of which is movable, the material being threaded into the apparatus in such a way that as it passes between the said plates it keeps them at those distances apart which correspond to its respective thicknesses at the different points. In a preferred constructional version of the invention, the fixed plate consists of a thin, conductive, wear-resisting plate of which one end is secured to a fixed part of the apparatus, such as its housing as a whole, and which terminates in an inclined portion which makes it easier to place the thread concerned in position; in this case, the movable plate consists of a thin elastic plate, likewise conductive and resistant to wear, one end being secured to an insulating support while the other end is supported elastically against the fixed plate and at a point where the inclined portion of this latter commences.

The differentiator circuit used may consist of a condenser and a resistance which are connected L-wise in such a way that the condenser charges itself at the rectified voltage when no alteration occurs in the capacity of the variable impedance but gives passage to the entire impulse produced at the said voltage when a change occurs in the aforementioned capacity.

In order that the present invention may be readily carried into effect, it will now be described with reference to the accompanying drawings, wherein:

FIG. 1 is a schematic circuit diagram of an embodiment of the circuit arrangement of the present invention;

FIG. 2 is a view of an embodiment of the detector condenser 4 which may be utilized in the circuit arrangement of FIG. 1;

FIG. 3 is a sectional view through the fixed plate portion of the condenser of FIG. 2;

Figure 4:
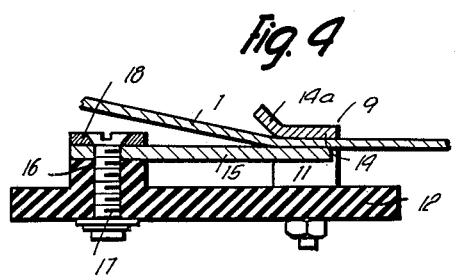
FIG. 4 is a sectional view through the movable plate portion of the condenser of FIG. 2.

In FIG. 1, 1 is a textile thread moving rapidly in the direction shown by the arrow 2 and containing a burl 3, shown at the moment it passes across the detector condenser 4.

It will be seen that this condenser 4 is connected in series with a resistance 5 and that the terminals of the voltage-divider unit thus formed are connected via the conductors 6 to a transmission line 7 through which the desired number of units of apparatus such as that described can be fed from an alternating current generator 8.

The condenser, in the constructional version illustrated in FIGS. 2 to 4, consists of a steel plate 9 secured by means of the screw 10 to the projection 11 provided on the external surface of the insulating plate 12. That end 13 of the said plate which is adjacent to the aforesaid screw is bent at a right angle and inserted in a groove provided at the edge of the plate 11, in order to ensure correct alignment of the aforementioned steel plate. The free end of the latter is bent so as to diverge from the insulating plate, as shown at 14. This steel plate constitutes the plate connected to the earth side of the condenser. The opposite plate consists of a thin elastic plate 15, which may be of steel and of which one end is secured to the projection 16, likewise provided on the aforesaid plate 12 by means of the screw 17 and the pressure plate 18, while its opposite end is free, which latter, as a result of the elasticity of the plate itself, presses against the lower part of the steel plate 9, at a point on its flat portion, which is adjacent to its point of deflection. The ingoing edge of the plate 14 may be bevelled at 14a, to facilitate the passage of the thread.

As will be seen, the thread passes between these two elements in such a way that the elastic plate 15 will be separated by a greater or smaller distance from the fixed element, in accordance with the thickness of the particular portion of thread present between the two elements, thereby allowing the capacity of the condenser thus formed to vary in accordance with the aforesaid thickness.

As will be noted in FIG. 1, the terminals of the condenser are connected to the input of a standard type of rectifier 19, of which the output is connected to the input of the differentiator circuit 20, consisting of the condenser 21 and the resistance 22, which are connected L-wise. When the thread passing through the condenser is of uniform thickness, the alternating voltage prevailing between the terminals of the condenser is rectified at 19 and charges the condenser 21 through the resistance 22. When a change takes place in the thickness of the thread passing through the detector, a change will likewise take place in the gap separating the plates of this latter, with a resultant alteration of capacity. This gives rise to an electrical impulse which passes through the differentiator 20 and reaches the amplifier 23, which may be of any type capable of supplying suitable current to the output conductors 24 which feed the electro-magnet 25. The moving core of this latter is connected with a knife 26, which consequently moves against the block 27, thus cutting the thread passing between them.

The said amplifier may actuate a device indicating the operation of the apparatus and possibly a means for shutting off the machine or that part of it to which the cut thread corresponds.

It will be understood that the operation of the apparatus does not depend on the various thread-diameters which can be processed by the machine with which it is equipped, since the amplifier 23 will not receive any control impulse except when an instantaneous variation takes place in the voltage at which the condenser 21 is charged. Nevertheless, the most suitable adjusting devices may, if necessary, be provided in the circuit, for the purpose of regulating the sensitivity of the apparatus, this being done, for example, by rendering the resistance 5 (or other type of impedance) adjustable, or else by varying the alternating voltage supplied by the generator 8. All such variations are likewise included in the scope of the invention.

Figure 5:
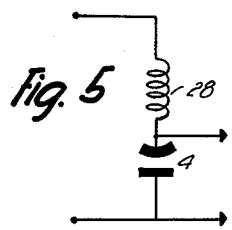
FIG. 5 is a schematic circuit diagram of a first modification of the voltage divider portion of the circuit arrangement of FIG. 1.
Figure 6:
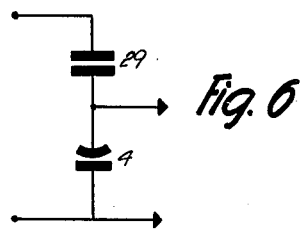
FIG. 6 is a schematic circuit diagram of a second modification of the voltage divider portion of the circuit arrangement of FIG. 1.
Figure 7:
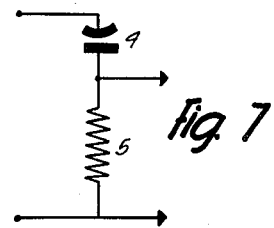
FIG. 7 is a schematic circuit diagram of a third modification of the voltage divider portion of the circuit arrangement of FIG. 1.
Figure 8:
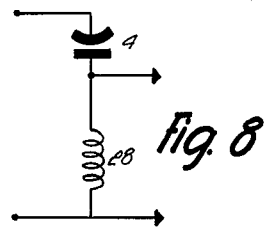
FIG. 8 is a schematic circuit diagram of a fourth modification of the voltage divider portion of the circuit arrangement of FIG. 1.
Figure 9:
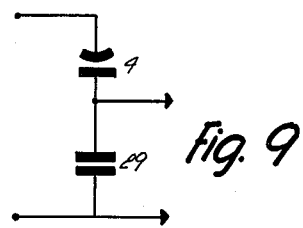
FIG. 9 is a schematic circuit diagram of a fifth modification of the voltage divider portion of the circuit arrangement of FIG. 1.

It will also be clear that the supplementary impedance of the voltage-divider may consist of an inductance 28 (FIG. 5) or of a condenser 29 (FIG. 6). Furthermore, the relative positions of the fixed impedance and the detector of the voltage-divider may be reversed, as shown in FIGS. 7 to 9, for each of the sets of circumstances described in the foregoing.

What I claim and desire to secure by Letters Patent is:

1. A circuit arrangement for detecting variations from a selected thickness in an elongated member comprising, in combination, a voltage divider circuit including a variable capacitor having a pair of plates in spaced relation to each other and adapted to produce a variable capacity of said capacitor and a variable voltage across said capacitor in accordance with a variation of the distance between the plates thereof; means for applying an alternating voltage across said capacitor; means for guiding said elongated member between the plates of said capacitor in a manner whereby the plates of said capacitor are spaced from each other a distance equal to the thickness of said elongated member, the plates of said capacitor being adjusted so that when the thickness of said elongated member is equal to said selected thickness said capacitor produces an alternating voltage of substantially continuous peak magnitude across its plates and when the thickness of said elongated member is greater than said selected thickness said capacitor produces a transient voltage of a magnitude greater than said continuous peak magnitude across its plates; a differentiator circuit having an input and an output, said differentiator circuit being adapted to remain quiescent when energized by a voltage of substantially continuous peak magnitude and to produce a control pulse when energized by a transient voltage of a magnitude greater than said continuous peak magnitude; rectifier means coupling the input of said differentiator circuit across said capacitor for detecting the peaks of one polarity of the alternating voltage produced by said capacitor; and operating means coupled to the output of said differentiator circuit for performing a predetermined operation when energized by said control pulse.

2. A circuit arrangement for detecting variations from a selected thickness in an elongated member comprising, in combination, a voltage divider circuit including a variable capacitor having a pair of plates in spaced relation to each other and adapted to produce a variable capacity of said capacitor and a variable voltage across said capacitor in accordance with a variation of the distance between the plates thereof; means for applying an alternating voltage across said capacitor; means for guiding said elongated member between the plates of said capacitor in a manner whereby the plates of said capacitor are spaced from each other a distance equal to the thickness of said elongated member, the plates of said capacitor being adjusted so that when the thickness of said elongated member is equal to said selected thickness said capacitor produces an alternating voltage of substantially continuous peak magnitude across its plates and when the thickness of said elongated member is greater than said selected thickness said capacitor produces a transient voltage of a magnitude greater than said continuous peak magnitude across its plates; a differentiator circuit having an input and an output, said differentiator circuit being adapted to remain quiescent when energized by a voltage of substantially continuous peak magnitude and to produce a control pulse when energized by a transient voltage of a magnitude greater than said continuous peak magnitude, said differentiator circuit including a capacitor adapted to be charged by said voltage of substantially continuous peak magnitude and to produce said control pulse when said transient voltage is applied thereto; rectifier means coupling the input of said differentiator circuit across said capacitor for detecting the positive peak of the alternating voltage produced by said capacitor; and operating means coupled to the output of said differentiator circuit for performing a predetermined operation when energized by said control pulse.

3. A circuit arrangement for detecting variations from a selected thickness in an elongated member comprising, in combination, a voltage divider circuit comprising an impedance and a variable capacitor connected in series circuit arrangement with said impedance, said variable capacitor having a pair of plates in spaced relation to each other and adapted to produce a variable capacity of said capacitor and a variable voltage across said capacitor in accordance with a variation of the distance between the plates thereof; means for applying an alternating voltage across the series circuit arrangement of said impedance and said variable capacitor; means for guiding said elongated member between the plates of said capacitor in a manner whereby the plates of said capacitor are spaced from each other a distance equal to the thickness of said elongated member, the plates of said capacitor being adjusted so that when the thickness of said elongated member is equal to said selected thickness said capacitor produces an alternating voltage of substantially continuous peak magnitude across its plates and when the thickness of said elongated member is greater than said selected thickness said capacitor produces a transient voltage of a magnitude greater than said continuous peak magnitude across its plates; a differentiator circuit having an input and an output, said differentiator circuit being adapted to remain quiescent when energized by a voltage of substantially continuous peak magnitude and to produce a control pulse when energized by a transient voltage of a magnitude greater than said continuous peak magnitude, said differentiator circuit including a capacitor adapted to be charged by said voltage of substantially continuous peak magnitude and to produce said control pulse when said transient voltage is applied thereto; rectifier means coupling the input of said differentiator circuit across said capacitor for detecting the positive peaks of the alternating voltage produced by said capacitor; and operating means coupled to the output of said differentiator circuit for performing a predetermined operation when energized by said control pulse.

4. A circuit arrangement as claimed in claim 1 wherein said variable capacitor comprises a fixed plate and a movable plate, the latter being caused to move elastically against the former and said elongated member being caused to pass between the said plates.

5. A circuit arrangement as claimed in claim 4 wherein said fixed plate consists of a thin, conductive, wear-resisting plate, of which one end is fixedly secured and which terminates in an inclined portion rendering it easier to place said elongated member in position, while said movable plate comprises a thin elastic plate, which is likewise conductive and resistant to wear and of which one end is affixed to an insulating support while the opposite end rests elastically against said fixed plate and at a point near the part where the inclined portion of said fixed plate commences.

References Cited in the file of this patent
UNITED STATES PATENTS

| | | |
|---|---|---|
| 2,565,500 | Ingham | Aug. 28, 1951 |
| 2,936,511 | Wilson | May 17, 1960 |